US00RE49033E

(19) United States
(12) Reissued Patent
Rajendran et al.

(10) Patent Number: US RE49,033 E
(45) Date of Reissued Patent: Apr. 12, 2022

(54) ENABLING VIRTUAL WORKLOADS USING OVERLAY TECHNOLOGIES TO INTEROPERATE WITH PHYSICAL NETWORK SERVICES

(71) Applicant: Cisco Technology, Inc., San Jose, CA (US)

(72) Inventors: Saravankumar Rajendran, San Jose, CA (US); Ajit Sanzgiri, Los Gatos, CA (US)

(73) Assignee: CISCO TECHNOLOGY, INC., San Jose, CA (US)

(21) Appl. No.: 16/745,558

(22) Filed: Jan. 17, 2020

Related U.S. Patent Documents

Reissue of:
(64) Patent No.: 9,444,644
Issued: Sep. 13, 2016
Appl. No.: 14/691,712
Filed: Apr. 21, 2015

U.S. Applications:
(63) Continuation of application No. 13/789,721, filed on Mar. 8, 2013, now Pat. No. 9,049,115.
(Continued)

(51) Int. Cl.
*H04L 12/28* (2006.01)
*H04L 12/46* (2006.01)
(Continued)

(52) U.S. Cl.
CPC ..... *H04L 12/4675* (2013.01); *H04L 12/28* (2013.01); *H04L 12/4641* (2013.01); *H04L 12/66* (2013.01); *H04L 41/0806* (2013.01); *H04L 41/0823* (2013.01); *H04L 41/5041* (2013.01); *H04L 45/64* (2013.01); *H04L 49/70* (2013.01); *H04L 41/0893* (2013.01)

(58) Field of Classification Search
None
See application file for complete search history.

(56) References Cited

U.S. PATENT DOCUMENTS 6,735,198 B1 5/2004 Edsall et al.
6,807,172 B1 10/2004 Levenson et al.
(Continued)

OTHER PUBLICATIONS

Joseph et al, A Policy-aware Switching layer for data centers, Technical Report UCB/EECS-2008-82, Jun. 24, 2008.*
(Continued)

*Primary Examiner* — John M Hotaling
(74) *Attorney, Agent, or Firm* — Edell, Shapiro & Finnan, LLC

(57) ABSTRACT

A solution is provided to enable cloud service provider customers/users to offer physical network services to virtualized workloads that use overlay technologies, such as a Virtual Extensible Local Area Network (VXLAN). For a virtual workload that uses an overlay technology, an identifier is received of a logical network to which the virtual workload connects and a policy for the logical network. Based on the identifier of the logical network and the policy, a gateway is configured to connect traffic for the virtual workload on the logical network to a particular virtual local area network (VLAN) interface of the physical network service equipment on which the policy is configured.

47 Claims, 8 Drawing Sheets

Related U.S. Application Data

(60) Provisional application No. 61/736,577, filed on Dec. 13, 2012.

(51) Int. Cl.

| | |
|---|---|
| ***H04L 12/24*** | (2006.01) |
| ***H04L 12/66*** | (2006.01) |
| ***H04L 12/715*** | (2013.01) |
| ***H04L 12/931*** | (2013.01) |
| ***H04L 41/0806*** | (2022.01) |
| ***H04L 41/0823*** | (2022.01) |
| ***H04L 41/5041*** | (2022.01) |
| ***H04L 45/64*** | (2022.01) |
| ***H04L 49/00*** | (2022.01) |
| *H04L 41/0893* | (2022.01) |

(56) References Cited

U.S. PATENT DOCUMENTS

| | | | | |
|---|---|---|---|---|
| 7,558,960 | B2 | 7/2009 | Cam Winget et al. | |
| 7,987,272 | B2 | 7/2011 | Kumar et al. | |
| 8,037,180 | B2 | 10/2011 | Smith et al. | |
| 8,274,973 | B2 | 9/2012 | Sardar et al. | |
| 8,966,035 | B2 * | 2/2015 | Casado | H04L 45/54 709/223 |
| 9,049,115 | B2 | 6/2015 | Rajendran et al. | |
| 9,069,599 | B2 | 6/2015 | Martinez et al. | |
| 2007/0258464 | A1 * | 11/2007 | Hall | H04L 12/2856 370/395.52 |
| 2012/0281708 | A1 * | 11/2012 | Chauhan | H04L 63/0272 370/401 |
| 2012/0317136 | A1 * | 12/2012 | Papish | G06F 16/9535 707/769 |
| 2013/0044629 | A1 | 2/2013 | Biswas et al. | |
| 2013/0268643 | A1 * | 10/2013 | Chang | G06F 9/4856 709/223 |
| 2013/0297768 | A1 * | 11/2013 | Singh | H04L 43/00 709/224 |
| 2013/0332982 | A1 * | 12/2013 | Rao | H04L 63/0892 726/1 |
| 2014/0016501 | A1 * | 1/2014 | Kamath | H04L 45/64 370/253 |
| 2014/0071983 | A1 * | 3/2014 | Banavalikar | H04L 45/72 370/389 |
| 2014/0096183 | A1 * | 4/2014 | Jain | H04L 12/4641 726/1 |

OTHER PUBLICATIONS

Badidi et al., A Cloud-based approach for COntext Informaiton Provisioning ,World of COmputer science and information technology journal (WCSIT) ISSN:2221-0741, vol. 1, No. 3,63-70, 2011.*

Mudigonda, et al., "NetLord: A Scalable Multi-Tenant Network Architecture for Virtualized Datacenters," SIGCOMM'11, Aug. 15-19, 2011, 12 pages.

Cohen, et al., "DOVE: Distributed Overlay Virtual nEtwork Architecture," IBM Research Report, H-0315 (HAI1206-006) Jun. 17, 2011, 15 pages.

* cited by examiner

ENABLING VIRTUAL WORKLOADS USING OVERLAY TECHNOLOGIES TO INTEROPERATE WITH PHYSICAL NETWORK SERVICES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application is a continuation of U.S. patent application Ser. No. 13/789,721, filed Mar. 8, 2013, which claims priority to U.S. Provisional Application No. 61/736,577, filed Dec. 13, 2012. The entirety of these applications is incorporated herein by reference.

TECHNICAL FIELD

The present disclosure relates to virtual switches that use overlay technologies.

BACKGROUND

Virtualization of workloads has become pervasive and there is a need for customers to be able to use the existing installed base of physical network services (such as firewalls, load balancers etc.) to offer network service capability to the virtualized workloads in the same way as in the physical environment, in an on-demand, dynamic fashion, particularly in cloud service provider environments.

In the physical (baremetal) environment, application traffic is assigned to a specific virtual local area network (VLAN) to be sent to the firewall and the traffic from the firewall is sent on another VLAN for ultimate transmission to the network service. To satisfy the needs of large scale multi-tenancy requirements, overlay technologies such as Virtual Extensible LANs (VXLANs) are becoming popular. However, there is no easy way to offer physical network services (such as firewall services) for virtualized workloads using an overlay technology.

DESCRIPTION OF EXAMPLE EMBODIMENTS

Overview

A solution is provided to enable cloud service provider customers/users to offer physical network services to virtualized workloads that use overlay technologies, such as a Virtual Extensible Local Area Network (VXLAN). For a virtual workload that uses an overlay technology, an identifier is received of a logical network to which the virtual workload connects and a policy for the logical network. Based on the identifier of the logical network and the policy, a gateway is configured to connect traffic for the virtual workload on the logical network to a particular virtual local area network (VLAN) interface of the physical network service equipment on which the policy is configured.

Example Embodiments

A solution is presented herein that configures a gateway entity and one or more physical networking services so as to extend the physical networking services to virtualized network endpoints.

Figure 1:
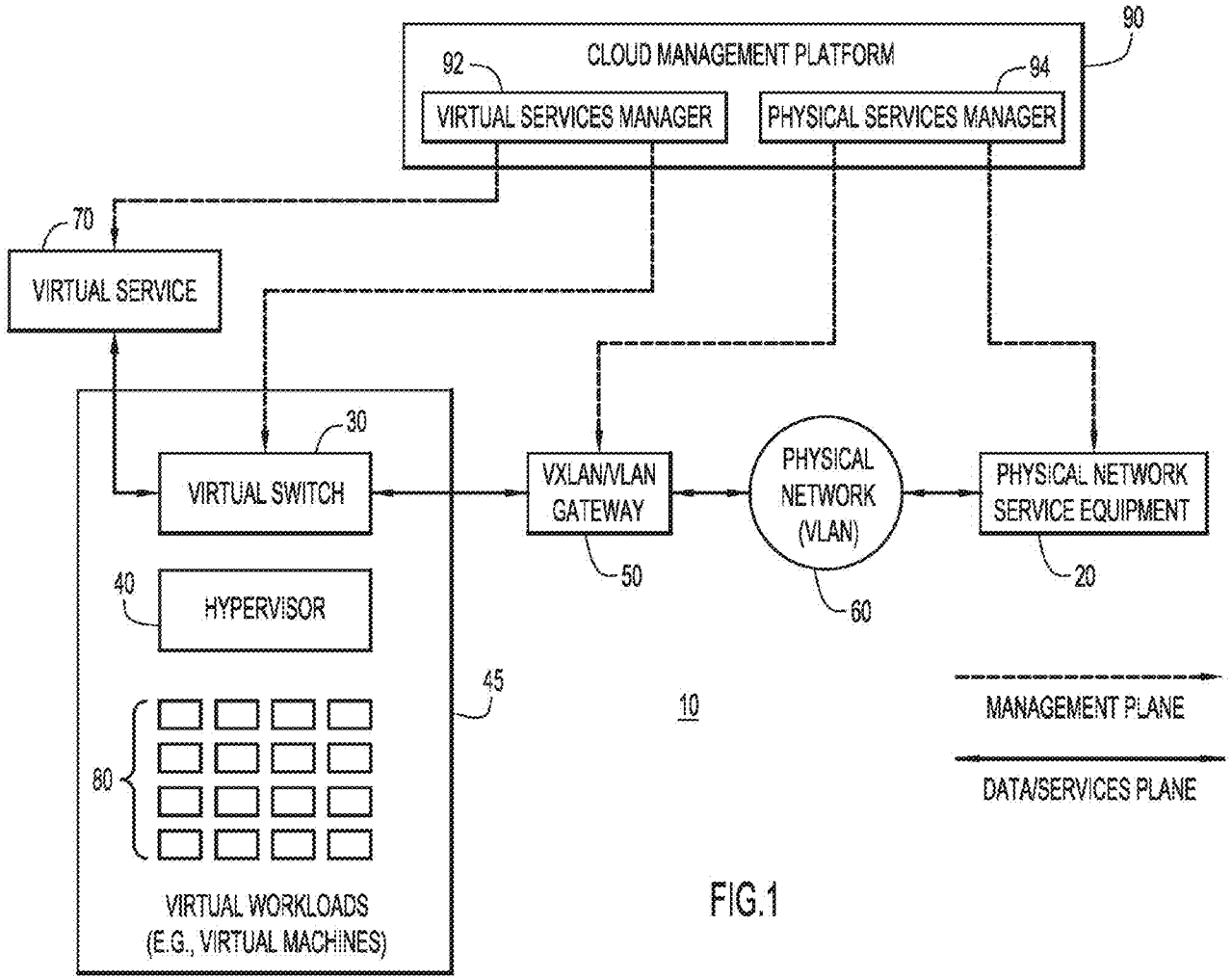
FIG. 1 is a block diagram of an example network environment in which services of physical network equipment are provided to virtualized workloads that use an overlay technology.

Reference is first made to FIG. 1 which shows a network environment 10 that has virtual network components and physical network service equipment. In FIG. 1, the physical network "world" is on the right side and the virtual network "world" is on the left side. The physical network service equipment is shown at reference numeral 20 and may include firewall equipment, load balancer equipment, switches, etc., each of which includes physical networking services capabilities. In other words, the physical network service equipment 20 is embodied by hardware and supporting software. An example of physical network service equipment is Cisco Systems Inc.'s Adaptive Security Appliance (ASA) 5500—Firewall services. Other examples of physical network service equipment/appliances include wide area network (WAN) acceleration devices (WAAS), intrusion prevention system (IPS) devices, etc. In physical computing/networking architectures, segmentation is achieved using virtual local area networks (VLANs). Currently, physical network services can only be applied on VLAN segments.

On the left side of the diagram, there is a virtual switch 30 running in a hypervisor 40 in a data center. The data center and its supporting equipment are not shown in FIG. 1 for simplicity. In virtualized multi-tenant environments, it is becoming common to use Virtual Extensible LANs (VXLANs). VXLANs are implemented in hypervisors and can only be used to connect to virtualized endpoints.

VXLAN is a technology to allow for "floating" virtual domains on top of a common networking and virtualization infrastructure. By leveraging industry-standard Ethernet technology, large numbers of virtual domains can be created, which can be isolated from each other and the underlying network. VXLAN provides the capability to create isolated, multi-tenant broadcast domains across data center fabrics, allowing for the creation of logical networks that span physical network boundaries.

VXLAN can be used to abstract a network into a generalized pool of network capacity. The use of these services can be separated from the underlying physical infrastructure. This pool can span physical boundaries, optimizing compute resource utilization across clusters, pods and even geographically separated datacenters. The pool of network capacity can be segmented into logical networks directly associated with specific applications.

VXLAN operates by creating Layer 2 logical networks that are encapsulated in standard Layer 3 IP packets. A "Segment ID" in every frame differentiates the individual logical networks (VXLANs) from each other. Numerous isolated Layer 2 VXLAN networks can therefore co-exist on a common Layer 3 infrastructure.

An example of another overlay technology that may be used, as an alternative to VXLAN, is Network Virtualization using Generic Routing Encapsulation (NVGRE).

FIG. 1 shows a VXLAN/VLAN gateway 50 connected between the virtual switch 30 and the physical network 60 to which the physical network service equipment 20 is connected. The VXLAN/VLAN gateway 50 permits traffic to be passed between the virtual network world (e.g., a VXLAN) and the physical network world, e.g., a VLAN. The VXLAN/VLAN gateway 50 may be embodied as a software function residing in the data center, such as part of the virtual switch 30 or as a hardware switching device or appliance.

A virtual service 70 is in communication with the virtual switch 30. Examples of a virtual service 70 include a Virtual Security Gateway (VSG) that serves as a virtual firewall appliance providing trusted access to virtual data center and cloud environments, a Virtual Wide Area Application Services (vWAAS) for application acceleration in private and public cloud environments, and a cloud router. There are virtual workloads, e.g., virtual machines, shown at reference numeral 80 in FIG. 1, that are running on the hypervisor 40.

FIG. 1 shows that there is a management plane depicted by the dotted arrows, and a data/services plane depicted by the solid arrows. A Cloud Management Platform (CMP) 90 is provided to perform control/management functions of the various entities in the network environment 10. In the CMP 90, there is a virtual services manager 92 and a physical services manager 94. The virtual services manager 92 communicates with, in order to configure, the virtual switch 30 and the virtual service 70. The physical services manager 94 communicates with, in order to configure, the physical network service equipment 20 and with the VXLAN/VLAN gateway 50. The CMP 90 may be embodied as one or more applications running on one or more physical or virtualized servers. Examples of CMPs include vCloud Director by VMware, System Center Virtual Machine Manager (SCVMM) for Microsoft, Openstack and Cloudstack/Cloudplatform for open source hypervisors.

Figure 2:
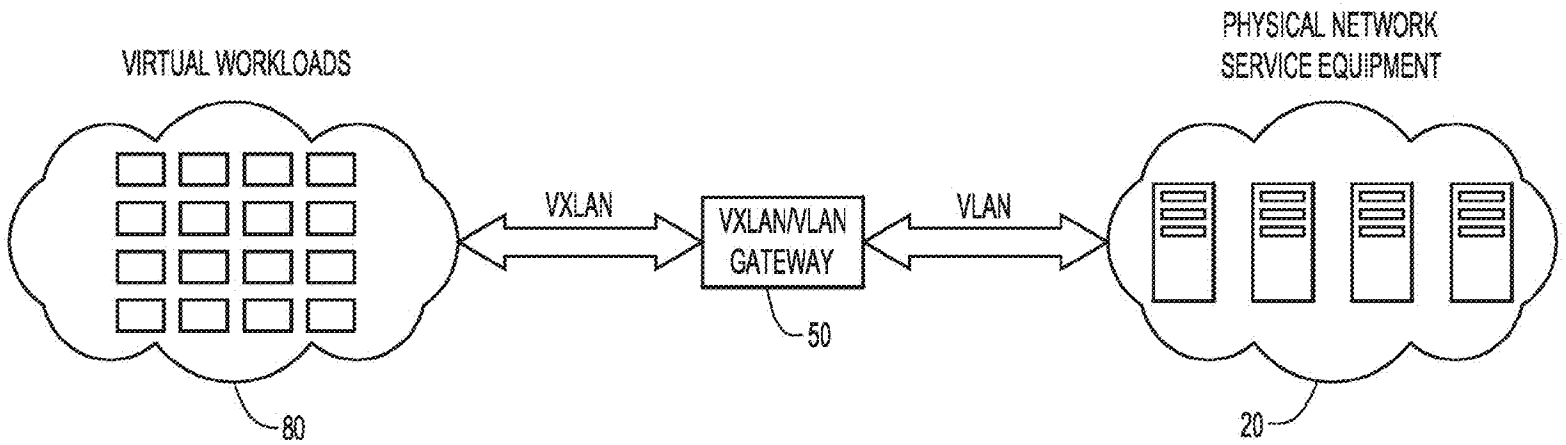
FIG. 2 is a block diagram depicting a gateway used to connect traffic of the virtualized workloads to the physical network equipment.

The arrangement shown in FIG. 1 enables cloud service provider customers to offer physical network services, e.g., firewall services, of the physical network service equipment 20 to the virtualized workloads 80 that connect to the network using overlays (e.g., VXLAN) via the VXLAN/VLAN gateway 50 in an on-demand, dynamic fashion through the CMP 90. This is depicted in a more isolated manner in the paradigm shown in FIG. 2.

Figure 3:
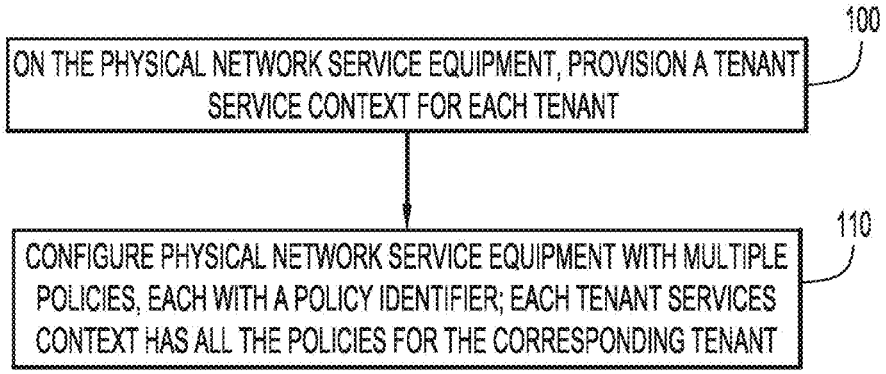
FIG. 3 is a flow chart generally depicting how services of the physical network equipment are provisioned for multiple tenants.

Reference is now made to FIG. 3 that illustrates a flow chart depicting operations to provision the physical network service equipment 20 for multiple tenants. Reference is made to FIG. 1 in connection with the description of the flow chart of FIG. 3. At step 100, the physical services manager 94 provisions the physical network service equipment 20 with a service context for each tenant. At step 110, the physical services manager 94 of the CMP 90 configures the physical network service equipment with multiple policies, each with a policy_id. Each policy is configured within the service context for the particular tenant. One VLAN is associated with each policy. Thus, VLAN_id1 is for policy_id1, VLAN_id2 is for policy_id2, and so on. Each policy is applied to data received on or sent to a corresponding specific VLAN interface. A tenant may have multiple logical networks, e.g., VLANs. As one example, a physical network service equipment 20 can scale to 1000 VLANs and 250 contexts.

A tie-in is built between the VXLAN segment_id that a virtual machine (VM) is using with the VLAN that is needed to transport the traffic to the appropriate context that is configured in the physical network service equipment, e.g., a firewall context in the case where the physical network service equipment is a firewall.

Figure 4:
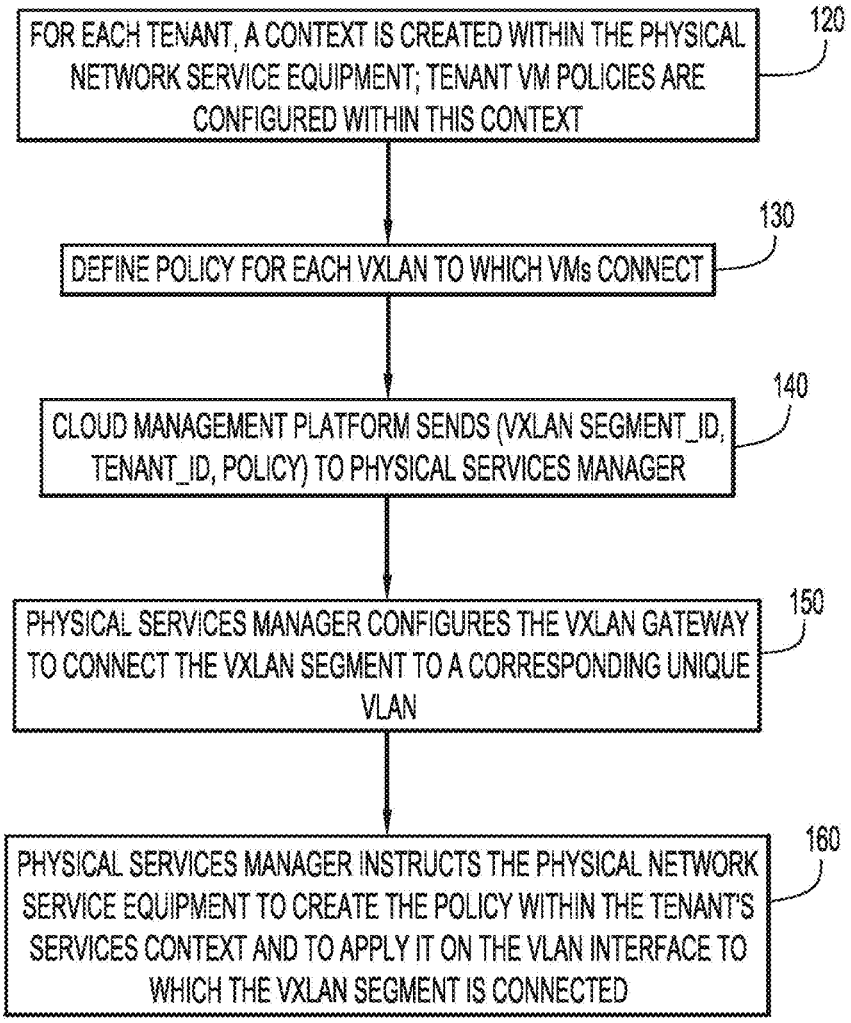
FIG. 4 is a flow chart depicting basic operations to enable utilization of the physical network service equipment by virtualized workloads that use an overlay technology.
Figure 5:
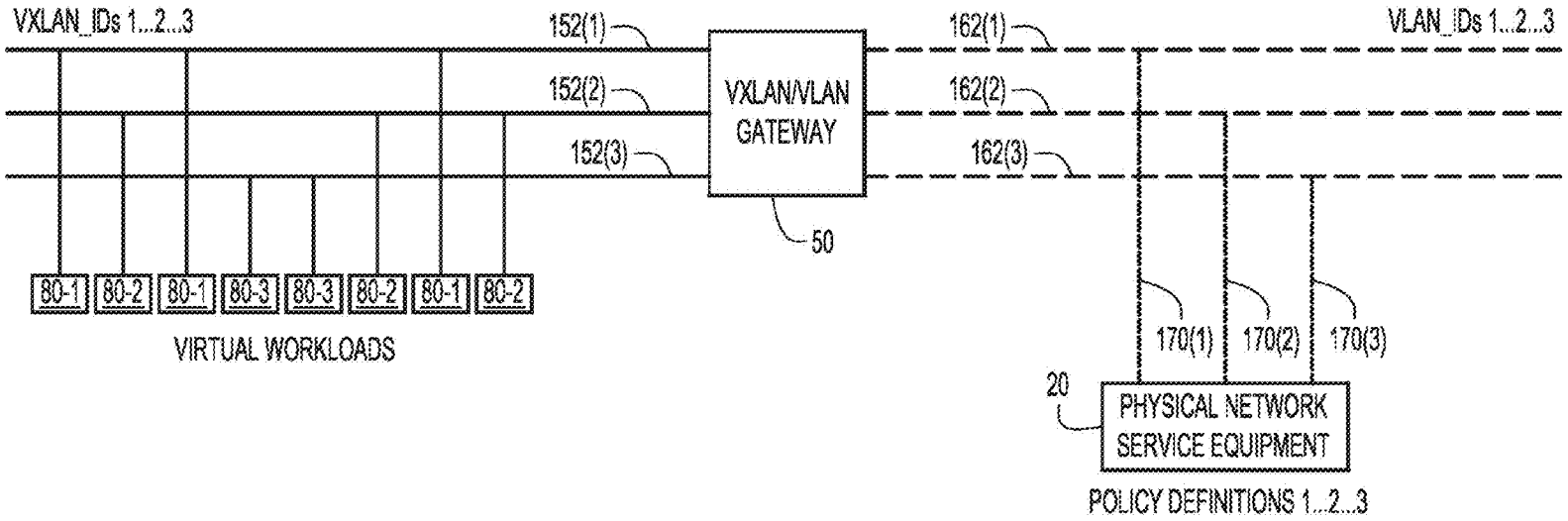
FIG. 5 is a diagram depicting an example paradigm for mapping of logical networks associated with the virtualized workloads to virtual local area network interfaces of the physical network service equipment.

Turning now to FIG. 4, a flow chart is provided that sets forth, in more detail, the setup to enable the techniques presented herein. FIG. 1 and FIG. 5 are also referred to in connection with the description of FIG. 4. FIG. 5 illustrates an example of a mapping between logical networks (e.g., VXLAN segments) in the virtual network world and VLANs in the physical network world.

Each VM is created within a tenant container. At step 120, through the physical services manager 94, a customer provisions the physical network service equipment 20 with a context for each tenant. Tenant VM policies are configured within each context. One or more VLANs may be associated with each context. Thus, each context contains multiple VLAN interfaces, each with its own policy configuration.

At 130, using the CMP 90, a user/customer acting on behalf of a tenant, defines a policy for each logical network (e.g., VXLAN) to which VMs connect. This policy is to be enforced by the physical network service equipment 20.

At 140, the CMP 90 sends the logical network identifier, tenant_id and policy information (VXLAN segment_id, tenant_id, policy) to the physical services manager 94. At 150, the physical services manager 94 configures the VXLAN/VLAN gateway 50 to connect the VXLAN segment to the VLAN_id on which the policy will be applied. At 160, the physical services manager 94 defines the policy on the physical network service equipment 20 within the given tenant's service context and instructs it to apply it on the VLAN_id to which the VXLAN segment is connected. The VXLAN/VLAN gateway 50 bridges traffic between a particular VXLAN segment_id (e.g. VXLAN 5500) and a VLAN_id (e.g. VLAN-55). In this example, VLAN 55 belongs to a particular context. The contexts and the associated security policies may be pre-provisioned in the physical network service equipment 20.

FIG. 5 shows traffic from virtual workloads 80(1), 80(2) and 80(3) associated with corresponding logical networks of VXLAN segments identified by segment_ids VXLAN_1, VXLAN_2 and VXLAN_3 shown at reference numerals 152(1), 152(2) and 152(3), respectively. The VLAN identifiers to which the VXLAN segment identifiers are mapped to are VLAN_1, VLAN_2 and VLAN_3, respectively, shown at reference numerals 162(1), 162(2) and 162(3). The VLAN interfaces on the physical network service equipment 20 for VLAN_1, VLAN_2 and VLAN_3 are shown at reference numerals 170(1), 170(2) and 170(3), respectively. When a customer creates a network using the CMP 90, the customer will create a logical network (and thus allocate a VXLAN segment_id) and associate this network (VXLAN segment) to a VLAN_id and context_id. The customer will choose the context_id based on the security profile he/she wants to associate with the VMs connecting to this network using a pull down menu that is published prior to the CMP 90. These profiles may be published as abstract names (e.g., web-server-fw-policy)

The CMP 90 will send this information (VXLAN segment_id, VLAN_id, context_name) to the physical services manager 94 which in turn configures the VXLAN/VLAN gateway 50 (for the VXLAN to VLAN mapping) and the physical services network equipment 20 for the VLAN to the context-name mapping.

Once this is setup, the VMs that connect to the network will send their traffic on that specific VXLAN segment-id through the virtual switch and to the VXLAN/VLAN gateway 50. The VXLAN/VLAN gateway 50 will bridge that traffic to the correct VLAN as defined in the mapping. The physical network service equipment 20 will apply the appropriate policy to the traffic as defined in the VLAN-context mapping. This process does not require any changes to the existing physical network service equipment 20.

Figure 6:
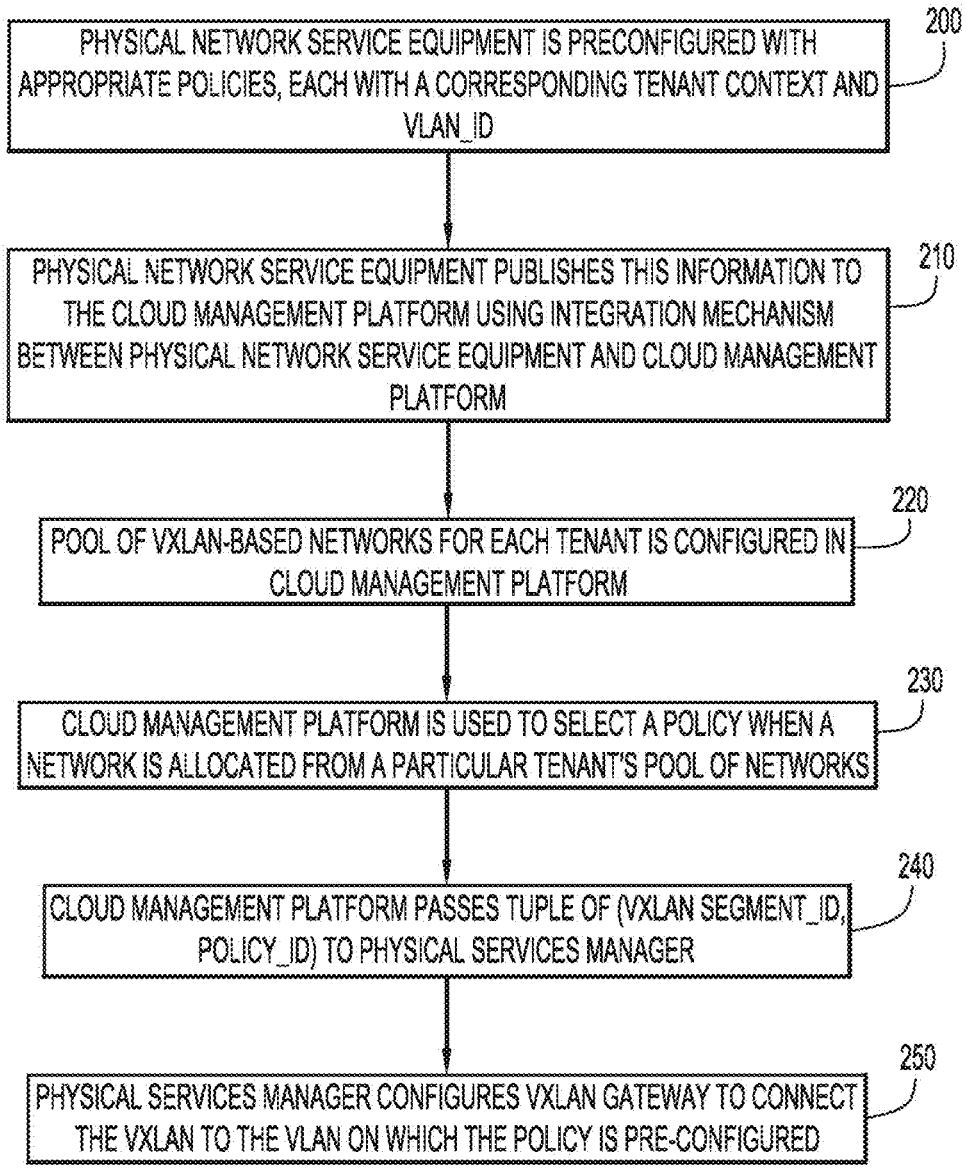
FIG. 6 is a flow chart depicting operations to enable utilization of preconfigured policies on the physical network service equipment by virtualized workloads.

Reference is now made to FIG. 6 (with continued reference to FIG. 1) for a description of a process similar to that depicted in FIG. 4, but used when the physical network service equipment 20 is preconfigured with its policies, etc. At 200, the physical network service equipment 20 (e.g., a firewall) is preconfigured with the appropriate policies (e.g., security/load-balancing etc.) each with the corresponding tenant context and VLAN-id. At 210, this information is published to the CMP 90, via the physical services manager 94, using an integration mechanism between the physical services manager 94 and the CMP 90. At 220, a pool of logical networks (e.g., VXLAN-based networks) for each tenant is configured in the CMP 90. At 230, when a network is allocated from a particular tenant's network pool, a corresponding policy is selected using the CMP 90. At 240, using Application Programming Interfaces (APIs) between the CMP 90 and physical services manager 94, the tuple of (policy identifier for the selected policy and VXLAN segment identifier) is passed to the physical services manager 94. At 250, based on the VXLAN segment identifier and policy identifier, the physical services manager 94 configures the VXLAN/VLAN gateway 50 to connect the VXLAN segment to the corresponding VLAN on which the policy is preconfigured on the physical network service equipment 20.

Figure 7:
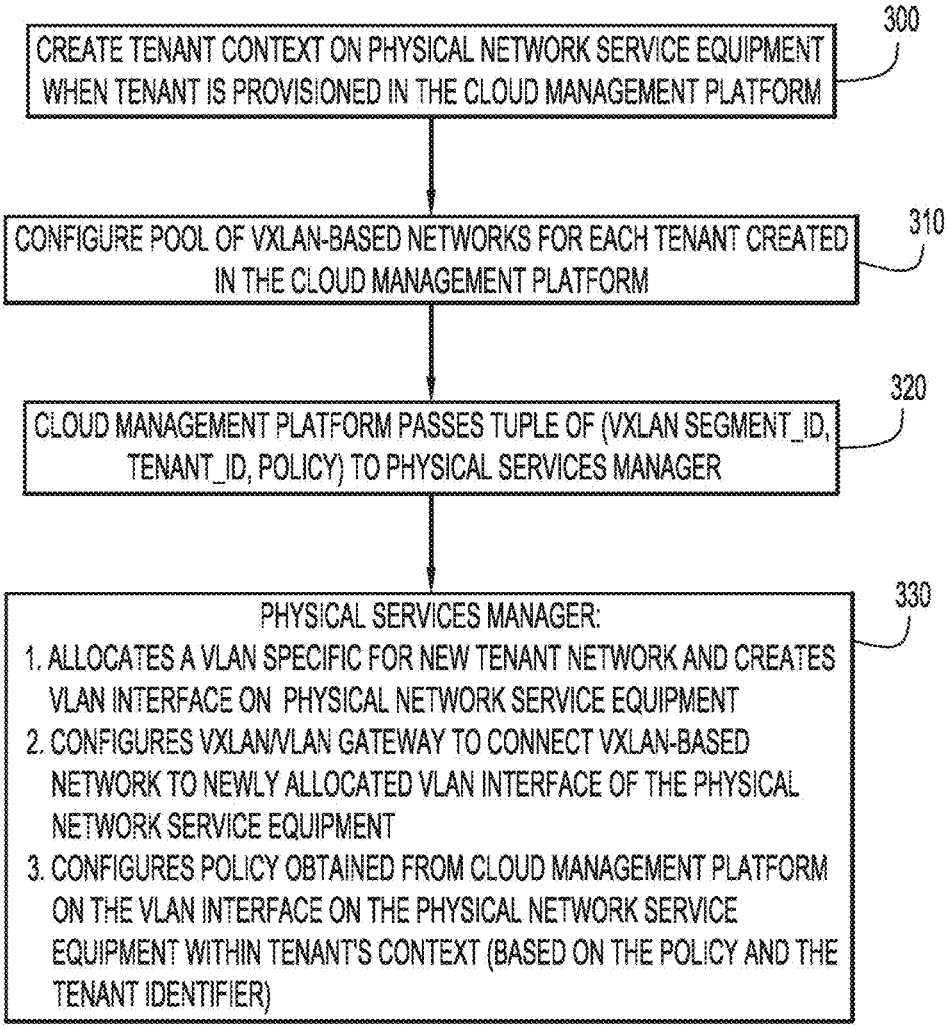
FIG. 7 is a flow chart depicting operations to enable utilization of on-demand configured policies on the physical network service equipment by virtualized workloads.

FIG. 7 illustrates a flow chart for a process in which policies are configured on-demand on the physical network service equipment 20. Again, reference is also made to FIG. 1 for this description. At 300, a tenant context is created on the physical network service equipment 20 when the tenant is provisioned in the CMP 90. At 310, a pool of logical networks (e.g., VXLAN-based networks) for each tenant is configured in the CMP. At 320, the CMP passes a tuple of (VXLAN segment_id, tenant_id and policy) to the physical services manager 94. At 330, the physical services manager 94 performs several operations. First, it allocates a VLAN specifically for the newly instantiated tenant network and creates the VLAN interface on the physical network service equipment 20. Second, it configures the VXLAN/VLAN gateway 50 to connect the VXLAN-based tenant network to the newly allocated VLAN interface on the physical network service equipment based on the VXLAN segment identifier. Third, it configures the policy obtained from the CMP on the VLAN interface in the physical network service equipment 20 within the tenant's context (based on the tenant identifier).

Figure 8:
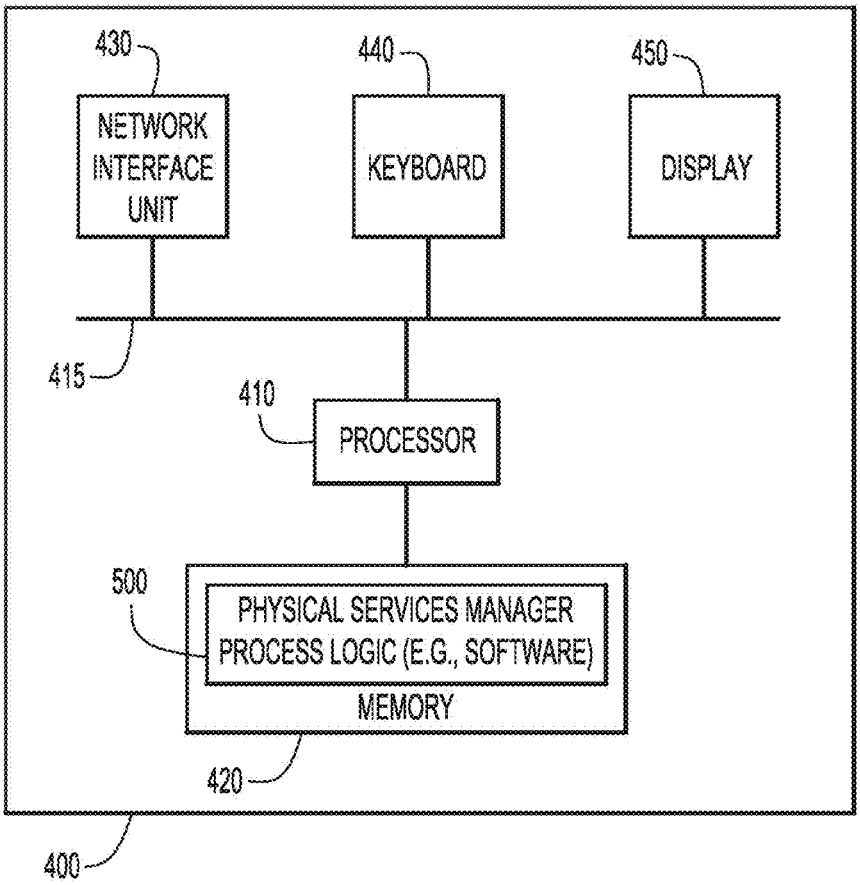
FIG. 8 is an example block diagram of a computing apparatus that performs operations of a physical services manager for configuring the gateway and physical network service equipment.

Turning now to FIG. 8, a block diagram is shown for a computing apparatus in which may reside software instructions for performing the functions of the physical services manager 94. This same computing apparatus may also include software instructions for the CMP 90 and the virtual services manager 92. The computing apparatus, shown at reference numeral 400, comprises a processor 410, a bus 415, memory 420, a network interface unit 430 and one or more user interface devices, such as a keyboard 440 and display 450. The processor 410 is a microcontroller or microprocessor that executes instructions stored in memory 420. The network interface unit 430 enables network communications to and from the computing apparatus 400.

The memory 420 may comprise read only memory (ROM), random access memory (RAM), magnetic disk storage media devices, optical storage media devices, flash memory devices, electrical, optical, or other physical/tangible memory storage devices. Thus, in general, the memory 420 may comprise one or more tangible (non-transitory) computer readable storage media (e.g., a memory device) encoded with software comprising computer executable instructions and when the software is executed (by the processor 410) it is operable to perform the operations described herein. More specifically, stored/encoded in memory 420 are instructions for physical services manager process logic 500, that when executed by processor 410, cause the processor 410 to perform the operations described herein for the CMP 90, virtual services manager 92 and physical services manager 94 in connection with FIGS. 1-7.

In summary, the foregoing solution provides for automated on-demand provisioning to leverage the installed base of physical network services. From a method perspective, a method is providing in which, for a virtual workload that uses an overlay technology, receiving an identifier of a logical network to which the virtual workload connects and a policy for the logical network; and based on the identifier of the logical network and the policy, configuring a gateway to connect traffic for the virtual workload on the logical network to a particular VLAN interface of the physical network service equipment on which the policy is configured.

This method may be embodied or implemented by computer executable instructions stored or encoded in a computer readable storage media, wherein the instructions are operable to: for a virtual workload that uses an overlay technology, receive an identifier of a logical network to which the virtual workload connects and a policy for the logical network; and based on the identifier of the logical network and the policy, configure a gateway to connect traffic for the virtual workload on the logical network to a particular VLAN interface of the physical network service equipment on which the policy is configured.

Further still, an apparatus, such as a computing apparatus, may be configured to perform these techniques. The apparatus comprises a network interface unit configured to enable network communications; a memory; and a processor coupled to the network interface unit and the memory, wherein the processor is configured to: for a virtual workload that uses an overlay technology, receive an identifier of a logical network to which the virtual workload connects and a policy for the logical network; and based on the identifier of the logical network and the policy, configure a gateway to connect traffic for the virtual workload on the logical network to a particular VLAN interface of the physical network service equipment on which the policy is configured.

The above description is intended by way of example only.

What is claimed is:

1. A method comprising:

receiving an identifier of a logical network to which a virtual workload connects and a policy for the logical network, wherein the virtual workload is associated with an overlay technology; and configuring, based on the identifier of the logical network and the policy, a gateway to connect traffic for the virtual workload on the logical network to a particular virtual local area network (VLAN) interface of physical network service equipment on which the policy is configured, wherein the physical network service equipment is provisioned with a service context for each of a plurality of tenants.

2. The method of claim 1, wherein receiving comprises receiving an identifier for a Virtual Extensible Local Area Network (VXLAN) segment associated with the virtual workload, and wherein configuring comprises configuring a VXLAN/VLAN gateway to connect traffic for the VXLAN segment to the particular VLAN.

3. The method of claim 2, wherein the physical network service equipment is preconfigured with one or more policies, each with a corresponding context and VLAN identifier, and further comprising:

publishing information pertaining to the policies preconfigured on the physical network service equipment and corresponding VLAN identifiers to a cloud management platform;

configuring a pool of VXLAN-based networks for each tenant in the cloud management platform; and selecting a policy when a network is allocated from a particular tenant's pool of networks and generating information comprising a VXLAN segment identifier and a policy identifier;

wherein configuring the gateway is based on the VXLAN segment identifier and the policy identifier.

4. The method of claim 2, further comprising:

creating a tenant context on the physical network service equipment when a tenant is provisioned in a cloud management platform;

configuring a pool of VXLAN-based networks for each tenant in the cloud management platform;

generating information comprising a policy, VXLAN segment identifier and tenant identifier based on the pool of VXLAN-based networks configured;

allocating a VLAN for a newly instantiated tenant network and creating a VLAN interface on the physical network service equipment;

configuring the policy obtained from the cloud management platform on the VLAN interface in the physical network service equipment within a tenant context based on the tenant identifier; and wherein configuring the gateway comprises configuring a VXLAN/VLAN gateway to connect the VXLAN-based tenant network to the VLAN interface on the physical network service equipment based on the VXLAN segment identifier.

5. The method of claim 1, further comprising:

provisioning the physical network service equipment with the service context for each tenant; and configuring the physical network service equipment with multiple policies, each policy within a service context for a particular tenant and having a policy identifier, and one VLAN being associated with each policy.

6. The method of claim 5, further comprising, through a cloud management platform, defining a policy for each logical network to which virtual machines within a service context connect.

7. The method of claim 6, wherein configuring the gateway is based on a logical network identifier, tenant identifier and policy information received from the cloud management platform.

8. One or more non-transitory computer readable storage media encoded with computer executable instructions that, when executed by a processor, cause the processor to:

receive an identifier of a logical network to which a virtual workload connects and a policy for the logical network, wherein the virtual workload is associated with an overlay technology; and configure, based on the identifier of the logical network and the policy, a gateway to connect traffic for the virtual workload on the logical network to a particular virtual local area network (VLAN) interface of physical network service equipment on which the policy is configured, wherein the physical network service equipment is provisioned with a service context for each of a plurality of tenants.

9. The non-transitory computer readable storage media of claim 8, wherein the instructions that cause the processor to receive an identifier of a logical network comprise instructions that cause the processor to receive an identifier for a Virtual Extensible Local Area Network (VXLAN) segment associated with the virtual workload, and wherein configuring comprises configuring a VXLAN/VLAN gateway to connect traffic for the VXLAN segment to the particular VLAN.

10. The non-transitory computer readable storage media of claim 9, wherein the physical network service equipment is preconfigured with one or more policies, each with a corresponding context and VLAN identifier, and further comprising instructions that cause the processor to:

publish information pertaining to the policies preconfigured on the physical network service equipment and corresponding VLAN identifiers to a cloud management platform;

configure a pool of VXLAN-based networks for each tenant in the cloud management platform; and select a policy when a network is allocated from a particular tenant's pool of networks and generating information comprising a VXLAN segment identifier and a policy identifier;

wherein the instructions that cause the processor to configure comprise instructions that cause the processor to configure the gateway based on the VXLAN segment identifier and the policy identifier.

11. The non-transitory computer readable storage media of claim 9, further comprising instructions that cause the processor to:

create a tenant context on the physical network service equipment when a tenant is provisioned in a cloud management platform;

configure a pool of VXLAN-based networks for each tenant in the cloud management platform;

generate information comprising a policy, VXLAN segment identifier and tenant identifier based on the pool of VXLAN-based networks configured;

allocate a VLAN for a newly instantiated tenant network and creating a VLAN interface on the physical network service equipment; and configure the policy obtained from the cloud management platform on the VLAN interface in the physical network service equipment within a tenant context based on the tenant identifier; and wherein the instructions operable to configure the gateway comprises instructions operable to configure a VXLAN/VLAN gateway to connect the VXLAN-based tenant network to the VLAN interface on the physical network service equipment based on the VXLAN segment identifier.

12. The non-transitory computer readable storage media of claim 8, further comprising instructions that cause the processor to:

provision the physical network service equipment with the service context for each tenant; and configure the physical network service equipment with multiple policies, each policy within a service context for a particular tenant and having a policy identifier, and one VLAN being associated with each policy.

13. The non-transitory computer readable storage media of claim 12, further comprising instructions that cause the processor to define a policy for each logical network to which virtual machines within a service context connect.

14. The non-transitory computer readable storage media of claim 13, wherein the instructions that cause the processor to configure the gateway comprise instructions that cause the processor to configure the gateway based on a logical network identifier, tenant identifier and policy information received from the cloud management platform.

15. An apparatus comprising:

a network interface unit configured to enable network communications; and

*a memory;* a processor coupled to the network interface unit and the memory, wherein the processor is configured to:

process a received identifier of a logical network to which a virtual workload connects and a policy for the logical network, wherein the virtual workload is associated with an overlay technology; and configure, based on the identifier of the logical network and the policy, a gateway to connect traffic for the virtual workload on the logical network to a particular virtual local area network (VLAN) interface of physical network service equipment on which the policy is configured, wherein the physical network service equipment is provisioned with a service context for each of a plurality of tenants.

16. The apparatus of claim 15, wherein the processor is configured to receive an identifier for a Virtual Extensible Local Area Network (VXLAN) segment associated with the virtual workload, and to configuring a VXLAN/VLAN gateway to connect traffic for the VXLAN segment to the particular VLAN.

17. The apparatus of claim 16, wherein the physical network service equipment is preconfigured with one or more policies, each with a corresponding context and VLAN identifier, and wherein the processor is further configured to:

publish information pertaining to the policies preconfigured on the physical network service equipment and corresponding VLAN identifiers to a cloud management platform; configure a pool of VXLAN-based networks for each tenant in the cloud management platform;

select a policy when a network is allocated from a particular tenant's pool of networks and generating information comprising a VXLAN segment identifier and a policy identifier; and configure the gateway based on the VXLAN segment identifier and the policy identifier.

18. The apparatus of claim 16, wherein the processor is further configured to:

create a tenant context on the physical network service equipment when a tenant is provisioned in a cloud management platform;

configure a pool of VXLAN-based networks for each tenant in the cloud management platform;

generate information comprising a policy, VXLAN segment identifier and tenant identifier based on the pool of VXLAN-based networks configured;

allocate a VLAN for a newly instantiated tenant network and creating a VLAN interface on the physical network service equipment;

configure the policy obtained from the cloud management platform on the VLAN interface in the physical network service equipment within a tenant context based on the tenant identifier; and configure a VXLAN/VLAN gateway to connect the VXLAN-based tenant network to the VLAN interface on the physical network service equipment based on the VXLAN segment identifier.

19. The apparatus of claim 16, wherein the processor is further configured to:

provision the physical network service equipment with the service context for each tenant; and configure the physical network service equipment with multiple policies, each policy within a service context for a particular tenant and having a policy identifier, and one VLAN being associated with each policy.

20. The apparatus of claim 19, wherein the processor is further configured to define a policy for each logical network to which virtual machines within a service context connect, and to configure the gateway based on a logical network identifier, tenant identifier and policy information received from the cloud management platform.

*21. The method of claim 1, wherein receiving an identifier of a logical network includes receiving an overlay segment identifier;*

*wherein the gateway is a logical network to virtual network gateway and configuring includes configuring the gateway to connect traffic for the identified overlay segment of the logical network to a particular VLAN, identified by a VLAN identifier; and*

*using the gateway to connect traffic between the logical network and a physical network connected to the physical network service equipment in accord with the policy, wherein the traffic in the logical network is isolated in part using the overlay segment identifier, and the traffic in the physical network is isolated in part using the VLAN identifier.*

*22. The method of claim 21, wherein the policy is applied to the physical network service equipment, and wherein the physical network service equipment includes at least one of firewall equipment, load balancer equipment, or a switch.*

*23. The method of claim 22, wherein the policy applied for a first tenant in the plurality of tenants differs from the policy applied for a second tenant in the plurality of tenants.*

*24. The method of claim 22, wherein a single VLAN is associated with a tenant.*

*25. The method of claim 22, wherein multiple VLANs are associated with a tenant.*

*26. The method of claim 22, wherein multiple virtual network segments are associated with a tenant.*

*27. The method of claim 21, further comprising:*

*creating a tenant context on the physical network service equipment when a tenant is provisioned in a cloud management platform;*

*configuring at least one overlay-based virtual network for the tenant in the cloud management platform;*

*generating the policy as a generated policy to be applied to the physical network service equipment, wherein the physical network service equipment includes at least one of firewall equipment, load balancer equipment, or a switch;*

*creating a VLAN interface on the physical network service equipment;*

*connecting the VLAN interface to the overlay-based virtual network identified by the overlay segment identifier; and*

*configuring the physical network service equipment to act according to the generated policy when connecting traffic between the virtual and the physical network.*

*28. The method of claim 21, further comprising:*

*provisioning the physical network service equipment with the service context for each tenant; and*

*configuring the physical network service equipment with multiple policies, each policy within a service context for a particular tenant.*

*29. The method of claim 28, further comprising, through a cloud management platform, defining a policy for each logical network to which virtual machines within a service context connect.*

*30. The non-transitory computer readable storage media of claim 8, wherein the instructions that cause the processor to receive an identifier of a logical network include instructions that cause the processor to receive an overlay segment identifier;*

*wherein the gateway is a logical network to virtual network gateway and the instructions that cause the processor to configure include instructions that cause the processor to configure the gateway to connect traffic for the identified overlay segment of the logical network to a particular VLAN, identified by a VLAN identifier; and*

*wherein the instructions are configured to cause the processor to use the gateway to connect traffic between the logical network and a physical network connected to the physical network service equipment in accord with the policy, wherein the traffic in the logical network is isolated in part using the overlay segment identifier, and the traffic in the physical network is isolated in part using the VLAN identifier.*

*31. The non-transitory computer readable storage media of claim 30, wherein the policy is applied to the physical network service equipment, and wherein the physical network service equipment includes at least one of firewall equipment, load balancer equipment, or a switch.*

*32. The non-transitory computer readable storage media of claim 31, wherein the policy applied for a first tenant in the plurality of tenants differs from the policy applied for a second tenant in the plurality of tenants.*

*33. The non-transitory computer readable storage media of claim 31, wherein a single VLAN is associated with a tenant.*

*34. The non-transitory computer readable storage media of claim 31, wherein multiple VLANs are associated with a tenant.*

*35. The non-transitory computer readable storage media of claim 31, wherein multiple virtual network segments are associated with a tenant.*

*36. The non-transitory computer readable storage media of claim 30, wherein the instructions further cause the processor to:*

*create a tenant context on the physical network service equipment when a tenant is provisioned in a cloud management platform;*

*configure at least one overlay-based virtual network for the tenant in the cloud management platform;*

*generating the policy as a generated policy to be applied to the physical network service equipment, wherein the physical network service equipment includes at least one of firewall equipment, load balancer equipment, or a switch;*

*create a VLAN interface on the physical network service equipment;*

*connect the VLAN interface to the overlay-based virtual network identified by the overlay segment identifier; and*

*configure the physical network service equipment to act according to the generated policy when connecting traffic between the virtual and the physical network.*

*37. The non-transitory computer readable storage media of claim 30, wherein the instructions further cause the processor to:*

*provision the physical network service equipment with the service context for each tenant; and*

*configure the physical network service equipment with multiple policies, each policy within a service context for a particular tenant.*

*38. The non-transitory computer readable storage media of claim 37, wherein the instructions further cause the processor to, through a cloud management platform, define a policy for each logical network to which virtual machines within a service context connect.*

*39. An apparatus comprising:*

*a network interface unit configured to enable network communications; and*

*a memory;*

*a processor coupled to the network interface unit and the memory, wherein the processor is configured to:*

*process a received identifier of a logical network to which a virtual workload connects and a policy for the logical network, wherein the virtual workload is associated with an overlay technology; and*

*configure, based on the identifier of the logical network and the policy, a gateway to connect traffic for the virtual workload on the logical network to a particular virtual local area network (VLAN) interface of physical network service equipment on which the policy is configured, wherein the physical network service equipment is provisioned with a service context for each of a plurality of tenants,*

*wherein the gateway is a logical network to virtual network gateway, and the apparatus is configured to:*

*receive an overlay segment identifier;*

*configure the gateway to connect traffic for the identified overlay segment of the logical network to a particular VLAN, identified by a VLAN identifier; and*

*use the gateway to connect traffic between the logical network and a physical network connected to the physical network service equipment in accord with the policy, wherein the traffic in the logical network is isolated in part using the overlay segment identifier, and the traffic in the physical network is isolated in part using the VLAN identifier.*

*40. The apparatus of claim 39, wherein the policy is applied to the physical network service equipment, and*

*wherein the physical network service equipment includes at least one of firewall equipment, load balancer equipment, or a switch.*

*41. The apparatus of claim 40, wherein the policy applied for a first tenant in the plurality of tenants differs from the policy applied for a second tenant in the plurality of tenants.*

*42. The apparatus of claim 40, wherein a single VLAN is associated with a tenant.*

*43. The apparatus of claim 40, wherein multiple VLANs are associated with a tenant.*

*44. The apparatus of claim 40, wherein multiple virtual network segments are associated with a tenant.*

*45. The apparatus of claim 39, wherein the processor is further configured to:*

*create a tenant context on the physical network service equipment when a tenant is provisioned in a cloud management platform;*

*configure at least one overlay-based virtual network for the tenant in the cloud management platform;*

*generate the policy as a generated policy to be applied to the physical network service equipment, wherein the physical network service equipment includes at least one of firewall equipment, load balancer equipment, or a switch;*

*create a VLAN interface on the physical network service equipment;*

*connect the VLAN interface to the overlay-based virtual network identified by the overlay segment identifier; and*

*configure the physical network service equipment to act according to the generated policy when connecting traffic between the virtual and the physical network.*

*46. The apparatus of claim 39, wherein the processor is further configured to:*

*provision the physical network service equipment with the service context for each tenant; and*

*configure the physical network service equipment with multiple policies, each policy within a service context for a particular tenant.*

*47. The apparatus of claim 46, wherein the processor is configured to, through a cloud management platform, define a policy for each logical network to which virtual machines within a service context connect.*

* * * * *